2 Sheets—Sheet 1.

T. O. PERRY.

WINDMILL DERRICK.

No. 11,181. Reissued July 28. 1891.

Witnesses
Jean Elliott
H. M. Day.

Thos. O. Perry Inventor
By his Attorneys
Burton & Burton

T. O. PERRY.

WINDMILL DERRICK.

No. 11,181. Reissued July 28, 1891.

Witnesses
Jean Elliott
H. M. Day.

Thos. O. Perry, Inventor
By his Attorneys
Burton & Burton

UNITED STATES PATENT OFFICE.

THOMAS O. PERRY, OF CHICAGO, ILLINOIS.

WINDMILL-DERRICK.

SPECIFICATION forming part of Reissued Letters Patent No. 11,181, dated July 28, 1891.

Original No. 431,991, dated July 8, 1890. Application for reissue filed May 7, 1891. Serial No. 391,986.

*To all whom it may concern:*

Be it known that I, THOMAS O. PERRY, a citizen of the United States, residing at Chicago, county of Cook, and State of Illinois, have invented a new and useful Windmill-Derrick, of which the following is a specification.

My invention relates to improvements in a windmill-derrick, (for which I have obtained Letters Patent of the United States, No. 375,378, bearing date December 27, 1887;) and the object of my improvements is to provide for supporting a windmill on a trussed mast pivoted on a base of such construction that neither the ties or braces of the base nor the trussing of the mast shall interfere with turning the mast on its pivot, as required, for bringing the wind-wheel down to the ground and for locking it fast to the base at the position at which it holds the mill elevated. I attain these objects by the mechanism illustrated in the accompanying drawings, in which—

Figure 1:
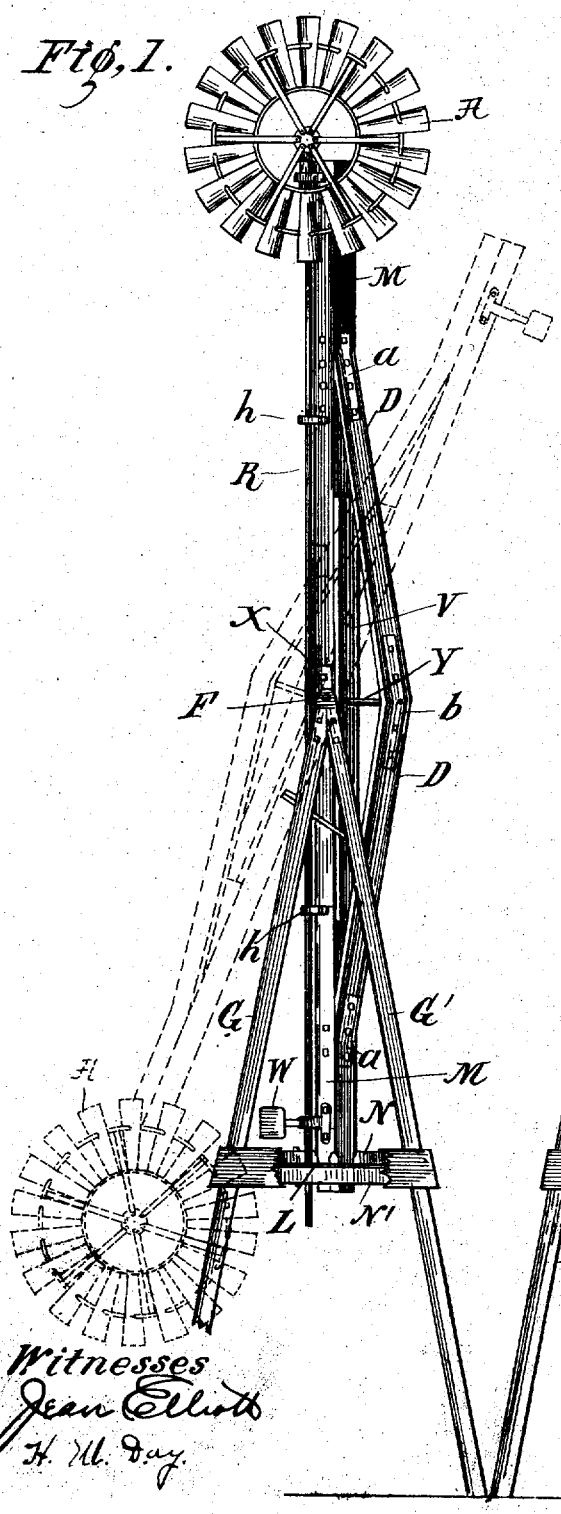
Figure 2:
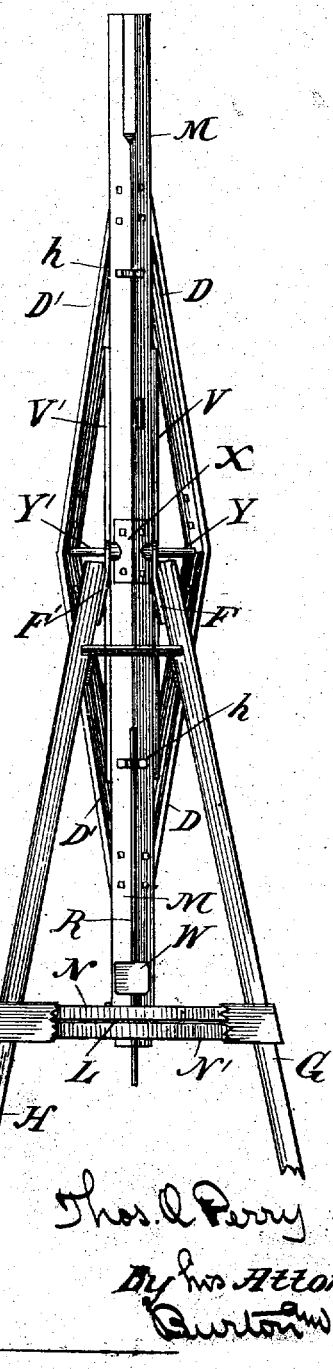
Figure 3:
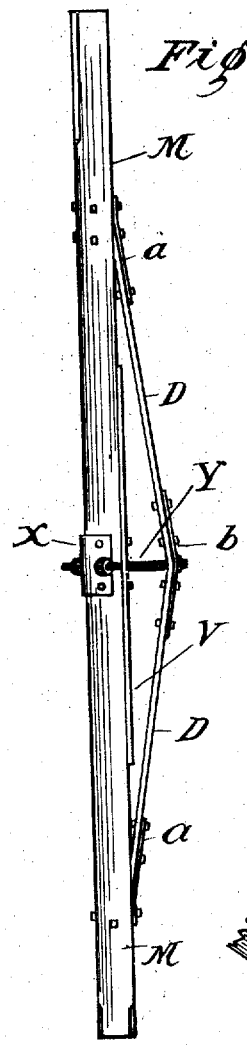
Figure 4:
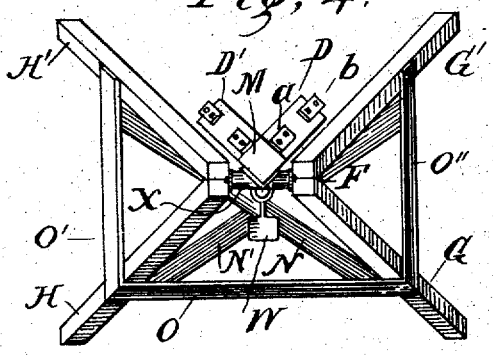
Figure 5:
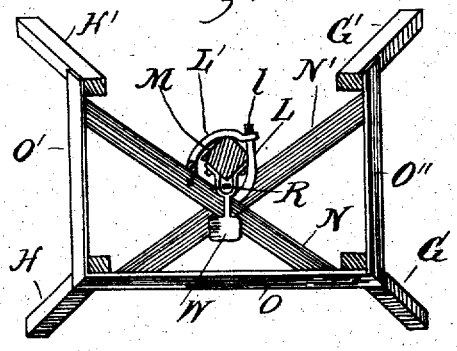
Figure 6:
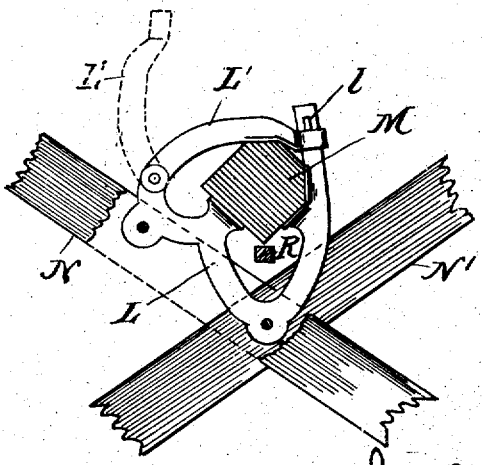
Figure 7:
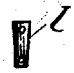

Figure 1 is a side view of the derrick with windmill attached to the pivoted mast. Fig. 2 is a front view of the derrick. Fig. 3 is an elevation showing the bracing of the pivoted mast, looking squarely at one side. Fig. 4 is a plan of the derrick. Fig. 5 is a sectional plan showing the lock, lock-timbers, and sections of the fulcrum-posts cut off just above the lock-timbers. Fig. 6 is an enlarged plan of the mast-lock. Fig. 7 is a side view of the lock-key enlarged.

Similar letters refer to similar parts throughout the several views.

M is a rectangular mast pivoted near the center of its length on top of a supporting-base and carrying a windmill A at its upper end. A reciprocating rod or revolving shaft R, actuated by the windmill, lies along one corner of the mast, to which it is attached by means of suitable guides or bearings *h*. The rod or shaft R serves for transmitting the power of the wind-wheel to driven machinery below. The pivot is formed by bolting to the front corner of the mast M a pivot-casting X with trunnions on opposite sides. The axis of the pivot is perpendicular to a plane containing the front corner of the mast and intersecting the right angle formed by the two adjacent sides, and is placed, preferably, far enough to the rear of the front corner of the mast so that the pivot-casting X will not interfere with the shaft R lying close against the corner. The trunnions of the pivot-casting X are fulcrumed either directly in the top of the fulcrum-posts or in two fulcrum-irons F F′, bolted to the tops of the fulcrum-posts G G′, H H′, and joining them together in pairs G G′ and H H′. These pairs of fulcrum-posts diverge from each other as they extend down toward the ground, and the posts in each pair also diverge from the fulcrum-iron uniting them, and are anchored to the ground in a line perpendicular to the direction of the axis of the mast-pivot. The four fulcrum-posts taken together form a rectangular pyramidal fulcrum-supporting base. The fulcrum-posts so diverge with reference to each other that the vertical projections of any two adjacent posts form a right angle with each other, as shown in Fig. 4.

A few feet above the ground two lock-timbers N and N′, united at their intersection with each other, join diagonally-opposite fulcrum-posts G H′ and G′ H. Tie-boards O O′ O″ tie the fulcrum-posts together on three sides of the base, leaving the rear side open between the posts G′ and H′, so as not to interfere with the swinging of the pivoted mast M. The lock-timbers N N′ are most conveniently secured by nailing the tie-boards O O′ O″ to their ends where they adjoin the fulcrum-posts, and are so placed that they intersect and join each other just back of the lower end of the mast, so as to make a convenient support for the mast-lock L L′ *l*.

Neither tie-boards nor braces are admissible between the rear posts G′ and H′, as they would interfere with swinging the mast from its vertical position about its pivot, as required, for bringing the wind-wheel down to the ground; but on the remaining three sides of the base the fulcrum-posts may be tied together and braced at intervals, as desired, since the wind-wheel can be brought down to the ground by tilting the mast, as indicated by the dotted lines in Fig. 1, where it will be noticed that the position of the tilted mast does not interfere with uniting the front fulcrum-posts G and H by bracing or boarding from top to bottom. The two lock-timbers N N′, fastened together at their intersection, in conjunction with the three tie-boards O O′ O″, make it unnecessary to unite the posts G′ and H′ with a fourth tie-board.

Other pairs of timbers similar to the lock-timbers N N′, in conjunction with corresponding tie-boards, may unite the four fulcrum-posts at any desired number of vertical intervals, and thus give rigidity to the two rear fulcrum-posts, which cannot be directly connected. The shape and position of the trussed mast also admits of direct ties and braces between diagonally-opposite fulcrum-posts, and the lock-timbers, with others similarly placed above, would make a part of such a system of bracing.

The mast-lock consists of a stop L, bolted securely to both lock-timbers N N′ at their intersection, and a clamp L′, hinged at one end to one side of the stop L, while the other end of the clamp is slotted to receive the projecting end of the other side of the stop, also slotted to receive a wedge-shaped key *l* back of the clamp to hold it pressed against the back corner of the mast when inclosed by the lock. The stop L is provided with two faces, which rest against the two adjacent front sides of the mast, leaving a clear space around the front corner of the mast for the uninterrupted passage of the shaft R.

To stiffen the pivoted mast M, two sets of braces D and D′ are applied to the two adjacent rear faces, so that the bracing stands out from the mast in two directions at right angles with each other, as shown in Fig. 4, where it will be seen that a vertical projection of the mast with its two sets of bracing just fits the angle formed between the vertical projections of the fulcrum-posts G′ and H′. The braces D form a triangle with the mast M, as a base, to which they are directly joined at their outer ends at some distance from each end of the mast, so that they may not interfere with the wind-wheel at the top and may leave room for attaching the counter-weight and mast-lock at the bottom. At the apex of the braces D their inner ends are joined securely together, and are also connected by a rigid tie-bar Y to the mast. The braces D, as well as the bar Y, are made to resist either tensile or compressive strains. What has been said of braces D and tie-bar Y applies also to braces D′ and tie-bar Y′. Thus the mast is a common member of two trusses, which hold it from bending under strains applied from any direction. The tie-bars Y and Y′ should take hold of the mast at or near the pivot-casting X. A mast trussed in this way need not be rigid in itself where it joins the pivot-casting X, but may be made of two pieces simply tied together by spiking two pieces of plank V and V′ across the joint. A counter-weight W is attached to the foot of the mast, and is made to project some distance in front of the mast-pivot, so as to counterbalance the weight of the trusses behind the pivot. In this way the trussed mast and windmill may be perfectly balanced in any position while swinging about the pivot.

What I claim, and desire to secure by Letters Patent, is—

1. In a windmill-derrick, in combination with two fulcrums and independent supports for the same, the mast pivoted intermediate its ends on said two fulcrums, whereby it is adapted to swing in a vertical plane between them and between the said two supports and extending both above and below the said fulcrum, the base formed by said two supports being unobstructed from the fulcrums down to the lower end of the mast on one of the sides of the base, which is cut by the plane of the mast's swinging movement, whereby the lower half of the mast may swing from within the outline of the base outward to permit the upper end to approach the ground, substantially as and for the purpose set forth.

2. In a windmill-derrick, in combination with the two fulcrums and independent supports for the same, a mast pivoted intermediate its ends on said two fulcrums, whereby it is adapted to swing in a vertical plane between the two supports and extending both above and below said fulcrums, the said supports being rigidly connected by braces located within the outline defined by the said supports and oblique to the plane of the mast's swinging movement, substantially as set forth.

3. In a windmill-derrick, in combination with two fulcrums and the two supporting posts of each fulcrum, said four posts forming the corners of the pyramidal base, the mast pivoted intermediate its ends on the two fulcrums, whereby it is adapted to swing in a vertical plane between them and between the two pairs of posts which support said fulcrums, respectively, the mast extending above and below said fulcrums, the pyramidal base, which is outlined by said four posts, being unobstructed from the fulcrums down to the lower end of the masts at one of the sides, which is cut by the plane of the mast's swinging movement, substantially as set forth.

4. In a windmill-derrick, two fulcrums and independent supports for the same, a mast pivoted on said fulcrums and thereby adapted to swing in a vertical plane between them and between their said supports, combined with a mast-lock supported between said fulcrum-supports, substantially as set forth.

5. In a windmill-derrick, in combination with a mast pivoted between two fulcrums sustained by four fulcrum-posts forming the corners of a rectangular pyramidal base, two lock-timbers connecting diagonally-opposite corners of said base, and a mast-lock attached to said lock-timbers at their intersection, whereby the said pivoted mast is secured in a vertical position or released so that it may swing on its pivot, substantially as herein set forth.

6. In a windmill-derrick, a pivoted mast stiffened by two pairs of trusses projecting from the sides thereof in two directions at right angles with each other and at the same time in directions oblique with reference to the pivoted axis of said mast, in combination with two supporting-fulcrums, between which said mast is pivoted, and a mast-lock supported between said fulcrums, whereby said mast may be secured in a vertical position or released to swing on its pivot, substantially as and for the purpose set forth.

7. In a windmill-derrick, in combination, a pivoted mast stiffened by two pairs of trusses projecting from the sides thereof in directions at right angles with reference to each other and obliquely with reference to the pivoted axis of said mast, two fulcrums between which said mast is pivoted, four fulcrum-posts forming the corners of a rectangular pyramidal fulcrum-supporting base, two lock-timbers connecting diagonally-opposite corners of said base, and a mast-lock attached to said lock-timbers at their intersection, whereby the said pivoted mast is secured in a vertical position or released to swing on its pivot, substantially as and for the purpose set forth.

8. In a windmill-derrick having a mast pivoted on a supporting-base, the lock-timbers N N′, uniting diagonally-opposite fulcrum-posts G H′ and G′ H, in combination with a mast-lock L L′ *l*, secured to said lock-timbers at their point of intersection with each other, substantially as and for the purpose set forth.

9. In a windmill-derrick having a mast pivoted on a supporting-base, the combination of the slotted stop L, secured to the lock-timbers N N′, the clamp L′, hinged to said stop, and the wedge *l*, substantially as herein shown and described.

10. In combination with the pivoted mast M, carrying a wind-wheel A at its upper end and having braces D D′ projecting from its sides behind the pivoted axis, a counterweight W, attached to said mast near its lower end and projecting in front of said pivoted axis for the purpose of balancing the said windmill and trussed mast, whatever position said mast may assume while turning on its pivot, substantially as herein shown and described.

In testimony whereof I have hereunto set my hand, at Chicago, Illinois, this 24th day of April, 1891.

THOMAS O. PERRY.

Witnesses:
ROBERT R. BAILEY,
D. ELROY BARNARD.